United States Patent
Doshi et al.

(10) Patent No.: US 8,349,932 B2
(45) Date of Patent: *Jan. 8, 2013

(54) POLYAMIDE COMPOSITIONS WITH IMPROVED SALT RESISTANCE AND HEAT STABILITY

(75) Inventors: Shailesh Ratilal Doshi, Kingston (CA); Annakutty Mathew, Kingston (CA); Marvin M. Martens, Bettendorf, IA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/015,616

(22) Filed: Jan. 28, 2011

(65) Prior Publication Data

US 2011/0190433 A1    Aug. 4, 2011

Related U.S. Application Data

(60) Provisional application No. 61/299,387, filed on Jan. 29, 2010.

(51) Int. Cl.
*C08K 3/10* (2006.01)
*C08K 3/22* (2006.01)

(52) U.S. Cl. ........ 524/413; 524/423; 524/424; 524/425; 524/435; 524/445; 524/447; 524/448; 524/449; 524/451; 524/456; 524/492; 524/493; 524/494; 524/495; 524/496; 524/503; 525/57; 525/58

(58) Field of Classification Search .................. 524/413, 524/423, 424, 425, 435, 445, 447, 448, 449, 524/451, 456, 492, 493, 494, 495, 496, 503; 525/57, 58

See application file for complete search history.

(56) References Cited

U.S. PATENT DOCUMENTS

| | | |
|---|---|---|
| 4,076,664 A | 2/1978 | Pagilagan |
| 4,427,825 A | 1/1984 | Degrassi et al. |
| 4,950,515 A | 8/1990 | Mason et al. |
| 5,547,765 A | 8/1996 | Degrassi et al. |
| 5,731,375 A | 3/1998 | Park et al. |
| 5,965,652 A | 10/1999 | El Sayed et al. |
| 2005/0234180 A1 | 10/2005 | Ono et al. |
| 2008/0193691 A1* | 8/2008 | Bussi et al. ............ 428/36.9 |
| 2009/0012229 A1 | 1/2009 | Desbois et al. |
| 2010/0029815 A1 | 2/2010 | Palmer et al. |
| 2010/0029819 A1 | 2/2010 | Palmer et al. |
| 2010/0159175 A1* | 6/2010 | Stoeppelmann et al. .... 428/36.9 |
| 2010/0233402 A1 | 9/2010 | Doshi et al. |

FOREIGN PATENT DOCUMENTS

| | | |
|---|---|---|
| EP | 0 272 503 | 6/1991 |
| EP | 1 041 109 | 3/2000 |
| EP | 1 088 852 | 4/2001 |
| GB | 839067 | 6/1960 |
| JP | 3271325 | 4/2002 |

OTHER PUBLICATIONS

International Search Report, PCT/US2011/022940, filed Jan. 28, 2011, date of mailing Oct. 19, 2011.

* cited by examiner

*Primary Examiner* — David W Wu
*Assistant Examiner* — Marie Reddick

(57) ABSTRACT

Disclosed is a polyamide composition including at least one semi-aromatic copolyamide, said semi-aromatic copolyamide consisting essentially of about 25 to about 55 mole percent repeat units of the formula $$-C(O)(CH_2)_mC(O)NHCH_2ArCH_2NH- \quad (I)$$

and about 45 to about 75 mole percent repeat units of the formula $$-C(O)(CH_2)_mC(O)NH(CH_2)_nNH- \quad (II)$$

wherein m is 8, 10, and/or 12, n is 6, 10 and/or 12 and Ar is a meta-substituted benzene ring; and said polyamide has a melting point equal to or less than 225° C.; and 0.25 to 20 weight percent of one or more polyhydroxy polymer(s) having a number average molecular weight of at least 2000 and selected from the group consisting of ethylene/vinyl alcohol copolymer and poly(vinyl alcohol). Also disclosed are molded or extruded articles including the polyamide composition.

7 Claims, No Drawings

POLYAMIDE COMPOSITIONS WITH IMPROVED SALT RESISTANCE AND HEAT STABILITY

CROSS REFERENCE TO RELATED APPLICATIONS

This application claims the benefit of U.S. Provisional Application No. 61/299,387, filed Jan. 29, 2010, which is incorporated herein by reference in its entirety.

FIELD OF INVENTION

The present invention relates to the field of polyamide compositions having improved salt resistance and heat stability.

BACKGROUND OF INVENTION

Polymeric materials, including thermoplastics and thermosets, are used extensively in automotive vehicles and for other purposes. They are light and relatively easy to fashion into complex parts, and are therefore preferred instead of metals in many instances. However a problem with some polymers is salt stress (induced) corrosion cracking (SSCC), where a part under stress undergoes accelerated corrosion when under stress and in contact with inorganic salts. This often results in cracking and premature failure of the part.

There also is a current desire in the automotive field to have high temperature resistant structures since temperatures higher than 150° C. are often reached in under-hood areas of automobiles. When plastic parts are exposed to such high temperatures for a prolonged period, such as in automotive under-the-hood applications or in electrical/electronics applications, the mechanical properties generally tend to decrease due to the thermo-oxidation of the polymer. This phenomenon is called heat aging.

Polyamides such as polyamide 6,6, polyamide 6, polyamide 6,10 and polyamide 6,12 have been made into and used as vehicular parts and other types of parts. While it has been reported that polyamides 6,10 and 6,12 are more resistant to SSCC (see for instance Japanese Patent 3271325B2), all of these polyamides are prone to SSCC in such uses, because for instance, various sections of vehicles and their components are sometimes exposed to salts, for example salts such as sodium chloride or calcium chloride used to melt snow and ice in colder climates. Corrosion of metallic parts such as fittings and frame components made from steel and various iron based alloys in contact with water and road salts can also lead to formation of salts. These salts, in turn, can attack the polyamide parts making them susceptible to SSCC. Thus polyamide compositions with better resistance to SSCC are desired.

U.S. Pat. No. 4,076,664 discloses a terpolyamide resin that has favorable resistance to zinc chloride.

European patent application 0272503 discloses a molding polyamide resin comprising poly(m-xylylenesebacamide) (PA MXD10) and a crystalline polyamide having a melting point about 20-30° C. higher than that of PA MXD10.

US 2005/0234180 discloses a resin molded article having an excellent snow melting salt resistance, said article comprising 1 to 60% by weight of aromatic polyamide resin.

In an attempt to improve heat aging characteristics, it has been the conventional practice to add heat stabilizers (also referred as antioxidants) to thermoplastic polyamide resins. Examples of such heat stabilizers include hindered phenol antioxidants, amine antioxidants and phosphorus-based antioxidants. For polyamide compositions, three types of heat stabilizers are conventionally used to retain the mechanical properties of the composition upon exposure to high temperatures. One is the use of phenolic antioxidants optionally combined with a phosphorus based synergist as previously mentioned, the use of aromatic amines optionally combined with a phosphorus based synergist and the third one is the use of copper salts and derivatives. Phenolic antioxidants are known to improve the mechanical/physical properties of the thermoplastic composition up to an aging temperature of 120° C.

U.S. Pat. No. 5,965,652 discloses a thermally stable polyamide molding composition containing colloidal copper formed in situ. However, the disclosed compositions exhibit retention of impact strength only for a heat aging at 140° C.

GB patent 839,067 discloses a polyamide composition comprising a copper salt and a halide of a strong organic base.

EP 1041109 discloses a polyamide composition comprising a polyamide resin, a polyhydric alcohol having a melting point of 150 to 280° C., that has good fluidity and mechanical strength and is useful in injection welding techniques.

US Patent publication 2010/0029819 discloses thermoplastic articles having high heat stability including a thermoplastic composition including a thermoplastic resin, one or more polyhydric alcohols having more than two hydroxyl groups.

US Patent publication 2010/0029815 A1 discloses thermoplastic article, including a thermoplastic polyamide composition including (a) a polyamide resin; one or more polyhydroxy polymer(s); one or more co-stabilizer(s) selected from the group consisting of secondary aryl amines, hindered amine light stabilizers, hindered phenols, and mixtures thereof; and 10 to about 60 weight percent of one or more reinforcement agents; having good heat stability.

Unfortunately, with the existing technologies, molded articles based on polyamide compositions either suffer from an unacceptable deterioration of their mechanical properties upon long-term high temperature exposure or they lack the salt resistance properties necessary for many automotive applications wherein parts become exposed to road salt. Needed are thermoplastic polyamide compositions that have improved long-term heat resistance and salt resistance.

SUMMARY OF INVENTION

Disclosed is a polyamide composition comprising
(a) at least one semi-aromatic copolyamide, said semi-aromatic copolyamide consisting essentially of 25 to 55 mole percent repeat units of the formula

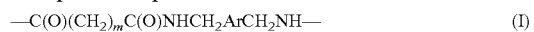
$$—C(O)(CH_2)_mC(O)NHCH_2ArCH_2NH— \quad (I)$$

and 45 to 75 mole percent repeat units of the formula

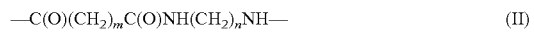
$$—C(O)(CH_2)_mC(O)NH(CH_2)_nNH— \quad (II)$$

wherein m is 8, 10, and/or 12, n is 6, 10 and/or 12 and Ar is a meta-substituted benzene ring; and said polyamide has a melting point equal to or less than 225° C.; and
(b) 0.25 to 20 weight percent of one or more polyhydroxy polymer(s) having a number average molecular weight of at least 2000 and selected from the group consisting of ethylene/vinyl alcohol copolymer and poly(vinyl alcohol).

Also disclosed are molded and extruded articles comprising the polyamide composition disclosed above.

DETAILED DESCRIPTION

Herein the stated weight percents of all components included in the polyamide composition are based upon the total weight of the polyamide composition.

The semi-aromatic copolyamide useful in the polyamide compositions has a melting point of less than or equal to about 225° C. Herein melting points and glass transitions are as determined with differential scanning calorimetry (DSC) at a scan rate of 10° C./min in the first heating scan, wherein the melting point is taken at the maximum of the endothermic peak and the glass transition, if evident, is considered the mid-point of the change in enthalpy.

The polyamide composition disclosed herein comprises at least one semi-aromatic copolyamide consisting essentially of 25 to 55 mole percent repeat units of the formula

and 45 to 75 mole percent repeat units of the formula

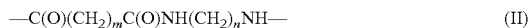

wherein m is 8, 10, and/or 12, n is 6, 10 and/or 12 and Ar is a meta-substituted benzene ring; and said polyamide has a melting point equal to or less than 225° C.

The term "m is 8, 10 and/or 12" means that m is one or more integers selected from the group consisting of 8, 10 and 12. The term "n is 6, 10, and/or 12" means that n is one or more integers selected from the group consisting of 6, 10 and 12.

Herein the term "one semi-aromatic copolyamide consisting essentially of" means that the copolyamide may have present repeat units other than those specified in formula (I) and (II), but only to the extent that they do not affect the salt resistant properties of the composition, as measured with the salt resistance characterization disclosed herein.

The semi-aromatic copolyamide may consist essentially of 31 to 55 mole percent repeat units of formula (I) and 45 to 69 mole percent repeat units of formula (II).

The semi-aromatic copolyamide may consist essentially of 35 to 55 mole percent repeat units of formula (I) and 45 to 65 mole percent repeat units of formula (II).

Preferred copolyamides are wherein m is equal to 8 or 10, respectively. Other preferred copolyamides are wherein n is equal to 6 or 10, respectively. Other preferred polyamides are wherein m is equal to 8, and n is equal to 6; and m is equal to 10 and n is equal to 6. Other preferred polyamides are wherein m is equal to 10, and n is 6; and wherein m is equal to 10, and n is equal to 10.

The semi-aromatic copolyamide is formed from polycondensation of a mixture of aliphatic dicarboxylic acids, aliphatic diamines, and meta-xylylene diamine (MXD) in the specified molar ratio disclosed above. Dicarboxylic acid monomers useful in preparing the copolyamides include decanedioic acid (C10), dodecanedioic acid (C12), and tetradecanedioic acid (C14). Aliphatic diamines include hexamethylene diamine, decamethylene diamine, and dodecamethylene diamine.

The following list exemplifies the abbreviations used to identify monomers and repeat units in the semi-aromatic copolyamides (PA):

| | |
|---|---|
| HMD | hexamethylene diamine (or 6 when used in combination with a diacid) |
| AA | Adipic acid |
| DMD | Decamethylenediamine |
| DDMD | Dodecamethylenediamine |
| DDA | Decanedioic acid |
| DDDA | Dodecanedioic acid |
| TDDA | Tetradecanedioic acid |
| MXD | meta-xylylene diamine |
| MXD6 | polymer repeat unit formed from MXD and AA |
| MXD10 | polymer repeat unit formed from MXD and DDA |
| MXD12 | polymer repeat unit formed from MXD and DDDA |
| 610 | polymer repeat unit formed from HMD and DDA |
| 612 | polymer repeat unit formed from HMD and DDDA |
| 1010 | polymer repeat unit formed from DD and DDA |
| 1012 | polymer repeat unit formed from DMD and DDDA |

The copolyamide may be prepared by any means known to those skilled in the art, such as in an batch process using, for example, an autoclave or using a continuous process. See, for example, Kohan, M. I. Ed. *Nylon Plastics Handbook*, Hanser: Munich, 1995; pp. 13-32. Additives such as lubricants, antifoaming agents, and end-capping agents may be added to the polymerization mixture.

The polyamide composition may comprise about 20 to 99.9 weight percent of at least one semi-aromatic copolyamide, as disclosed above. Other embodiments include 40 to 99.9 weight percent, 60 to 99.9 weight percent; and 85 to 99.9 weight percent of at least one semi-aromatic copolyamide.

The polyamide composition comprises 0.25 to 20 weight percent of at least one polyhydroxy polymer having a number average molecular weight ($M_n$) of at least 2000, selected from the group consisting of ethylene/vinyl alcohol copolymer and poly(vinyl alcohol); as determined for polymeric materials with gel permeation chromatography (GPC). Preferably the polyhydroxy polymer has a $M_n$, of 5000 to 50,000.

In one embodiment the polyhydroxy polymer is an ethylene/vinyl alcohol copolymer (EVOH). The EVOH may have a vinyl alcohol repeat content of 10 to 90 mol % and preferably 30 to 80 mol %, 40 to 75 mol %, 50 to 75 mol %, and 50 to 60 mol %, wherein the remainder mol % is ethylene. A suitable EVOH for the thermoplastic composition is Soarnol® A or D copolymer available from Nippon Gosei (Tokyo, Japan) and EVAL® copolymers available from Kuraray, Tokyo, Japan.

In one embodiment the polyhydroxy polymer is a poly (vinyl alcohol) polymer (PVOH). Suitable PVOH polymers for the thermoplastic composition are the Mowiol® brand resins available from Kuraray Europe Gmbh.

The molded or extruded thermoplastic article may comprise 1 to 15 weight percent, 1 to 10 weight percent; and preferably 1 to 7 weight percent and more preferably 2 to 7 weight percent polyhydroxy polymer based on the total weight of the thermoplastic polyamide composition.

The polyamide composition may optionally comprise additives including additives selected from the group consisting of polymeric tougheners, plasticizers, and reinforcing agents.

The polyamide composition, optionally, comprises 0 to 50 weight percent of a polymeric toughener comprising a reactive functional group and/or a metal salt of a carboxylic acid. In one embodiment the polyamide composition comprises 10 to 35 weight percent polymeric toughener selected from the group consisting of: a copolymer of ethylene, glycidyl (meth) acrylate, and optionally one or more (meth)acrylate esters; an ethylene/α-olefin or ethylene/α-olefin/diene copolymer grafted with an unsaturated carboxylic anhydride; a copolymer of ethylene, 2-isocyanatoethyl (meth)acrylate, and optionally one or more (meth)acrylate esters; and a copolymer of ethylene and (meth)acrylic acid reacted with a Zn, Li, Mg or Mn compound to form the corresponding ionomer.

Herein the term "(meth)acrylic" and "(meth)acrylate" encompass acrylic acid and methacrylic acid, and esters of acrylic acid and methacrylic acid, respectively.

The polyamide composition may optionally comprise at least one plasticizer. The plasticizer will preferably be miscible with the copolyamide. Examples of suitable plasticizers include sulfonamides, preferably aromatic sulfonamides such as benzenesulfonamides and toluenesulfonamides. Examples of suitable sulfonamides include N-alkyl benzenesulfonamides and toluenesulfonamides, such as N-butylbenzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide, and the like. Preferred are N-butylbenzenesulfonamide, N-ethyl-o-toluenesulfonamide, and N-ethyl-p-toluenesulfonamide.

The plasticizer may be incorporated into the composition by melt-blending the polymer with plasticizer and, optionally, other ingredients, or during polymerization. If the plasticizer is incorporated during polymerization, the copolyamide monomers are blended with one or more plasticizers prior to starting the polymerization cycle and the blend is introduced to the polymerization reactor. Alternatively, the plasticizer can be added to the reactor during the polymerization cycle.

When used, the plasticizer will be present in the composition in about 1 to about 20 weight percent, or more preferably in about 6 to about 18 weight percent, or yet more preferably in about 8 to about 15 weight percent.

The polyamide composition may optionally comprise 0 to about 60 weight percent, and preferably about 10 to 60 weight percent, and 15 to 50 weight percent, of one or more reinforcement agents. The reinforcement agent may be any filler, but is preferably selected from the group consisting calcium carbonate, glass fibers with circular and noncircular cross-section, glass flakes, glass beads, carbon fibers, talc, mica, wollastonite, calcined clay, kaolin, diatomite, magnesium sulfate, magnesium silicate, barium sulfate, titanium dioxide, sodium aluminum carbonate, barium ferrite, potassium titanate and mixtures thereof. Glass fibers, glass flakes, talc, and mica are preferred reinforcement agents.

The polyamide composition may optionally comprise additional additives such as thermal, oxidative, and/or light stabilizers; colorants; lubricants; mold release agents; and the like. Such additives can be added according to the desired properties of the resulting material, and the control of these amounts versus the desired properties is within the knowledge of the skilled artisan.

The polyamide composition may optionally comprise 0.1 to 3 weight percent of one or more co-stabilizer(s) having a 10% weight loss temperature, as determined by thermogravimetric analysis (TGA), of at least 250° C., selected from the group consisting of secondary aryl amines and hindered amine light stabilizers (HALS), and mixtures thereof. For the purposes of this invention, TGA weight loss will be determined according to ASTM D 3850-94, using a heating rate of 10° C./min, in air purge stream, with an appropriate flow rate of 0.8 mL/second. The co-stabilizer preferably has a 10% weight loss temperature, as determined by TGA, of at least 270° C., and more preferably 290° C., 320° C., and 340° C., and most preferably at least 350° C.

Mixtures of secondary aryl amines and HALS may be used. A preferred embodiment comprises at least two co-stabilizers, at least one selected from the secondary aryl amines; and at least one selected from the group of HALS, as disclosed above, wherein the total weight percent of the mixture of co-stabilizers is at least 0.5 wt percent, and preferably at least 0.9 weight percent.

In one embodiment the polyamide composition comprises less than 25 ppm copper as determined with atomic absorption spectroscopy.

Herein the polyamide composition is a mixture by melt-blending, in which all polymeric ingredients are adequately mixed, and all non-polymeric ingredients are adequately dispersed in a polymer matrix. Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing filler presents a long physical shape (for example, a long glass fiber), drawing extrusion molding may be used to prepare a reinforced composition.

In another aspect, the present invention relates to a method for manufacturing an article by shaping the polyamide composition of the invention. Examples of articles are films or laminates, automotive parts or engine parts or electrical/electronics parts. By "shaping", it is meant any shaping technique, such as for example extrusion, injection molding, thermoform molding, compression molding or blow molding. Preferably, the article is shaped by injection molding or blow molding.

The molded or extruded thermoplastic articles disclosed herein may have application in many vehicular components that meet one or more of the following requirements: high impact requirements; significant weight reduction (over conventional metals, for instance); resistance to high temperature; resistance to oil environment; resistance to chemical agents such as coolants and road salts; and noise reduction allowing more compact and integrated design. Specific molded or extruded thermoplastic articles are selected from the group consisting of charge air coolers (CAC); cylinder head covers (CHC); oil pans; engine cooling systems, including thermostat and heater housings and coolant pumps; exhaust systems including mufflers and housings for catalytic converters; air intake manifolds (AIM); and timing chain belt front covers. Other molded or extruded thermoplastic articles disclosed herein are selected from the group consisting of pipes for transporting liquids and gases, inner linings for pipes, fuel lines, air break tubes, coolant pipes, air ducts, pneumatic tubes, hydraulic houses, cable covers, cable ties, connectors, canisters, and push-pull cables.

The present invention is further illustrated by the following examples. It should be understood that the following examples are for illustration purposes only, and are not used to limit the present invention thereto.

Methods

Melting Point

Herein melting points were as determined with DSC at a scan rate of 10° C./min in the first heating scan, wherein the melting point is taken at the maximum of the endothermic peak.

Inherent Viscosity

Inherent viscosity (IV) was measured on a 0.5% solution of copolyamide in m-cresol at 25° C.

Compounding Method

All Examples and Comparative Examples were prepared by melt blending the ingredients listed in the Table(s) in a 25 mm twin screw extruder (ZSK 25 by Coperion) operating at about 250° C. barrel setting using a screw speed of about 300 rpm, a throughput of 15.0 kg/hour and a melt temperature measured by hand of about 260° C. Ingredient quantities shown in the Tables are given in weight percent on the basis of the total weight of the thermoplastic composition.

The compounded mixture was extruded in the form of laces or strands, cooled in a water bath, chopped into granules and placed into sealed aluminum lined bags in order to prevent moisture pick up. The cooling and cutting conditions were adjusted to ensure that the materials were kept below 0.20 wt % of moisture level.

Physical Properties Measurement

The Polyamide compositions were injection molded into test bars. The tensile and flexural properties were measured as per ASTM D638 and ASTM D790 test procedures, respectively. Yield stress and Young's modulus were measured using 115 mm (4.5 in) long and 3.2 mm (0.13 in) thick type IV tensile bars per ASTM D638-02a test procedure with a crosshead speed of 50 mm/min (2 in/min). Flexural modulus was measured using 3.2 mm (0.13 in) thick test pieces per ASTM D790 test procedure with a 50 mm (2 in) span, 5 mm (0.2 in) load and support nose radii and 1.3 mm/min (0.05 in/min) crosshead speed.

Air Oven Ageing (AOA)

The test specimens were heat aged in a re-circulating air ovens At various heat aging times, the test specimens were removed from the oven, allowed to cool to room temperature and sealed into aluminum lined bags until ready for testing. The average values obtained from 5 specimens are given in the Tables.

Retention of tensile strength (TS) and elongation at break (EL) corresponds to the percentage of the tensile strength and elongation at break after heat aging for 500 hours and 1000 hours in comparison with the value of specimens non-heat-aged control specimens considered as being 100%.

Salt Resistance Characterization

The method for stress crack resistance is based on ASTM D1693 which provides a method for determination of environmental stress-cracking of ethylene plastics in presence of surface active agents such as soaps, oils, detergents etc. This procedure was adapted for determining salt stress cracking resistance of copolyamides to salt solutions as follows.

Rectangular test pieces measuring 50 mm×12 mm×3.2 mm were used for the test. A controlled nick was cut into the face of each molded bar as per the standard procedure, the bars were bent into U-shape with the nick facing outward, and positioned into brass specimen holders as per the standard procedure. At least five bars were used for each copolymer. The holders were positioned into large test tubes.

The test fluid used was 50 weight percent zinc chloride solution prepared by dissolving anhydrous zinc chloride into water in 50:50 weight ratio. The test tubes containing specimen holders were filled with freshly prepared salt solution fully immersing the test pieces such that there was at least 12 mm of fluid above the top test piece. The test tubes were positioned upright in a circulating air oven maintained at 50° C. Test pieces were periodically examined for development of cracks.

Materials

PA 612/MXD12 (70/30 molar ratio) was prepared according to the following procedure:

A 10 L autoclave was charged with dodecanedioic acid (2548 g), meta-xylylene diamine (458 g), an aqueous solution containing 78 weight % of hexamethylene diamine (HMD) (1168 g), an aqueous solution containing 1 weight percent sodium hypophosphite (70 g), an aqueous solution containing 1 weight percent Carbowax 8000 (10 g), and water (2330 g). The autoclave agitator was set to 5 rpm and the contents were purged with nitrogen at 10 psi for 10 minutes. The agitator was then set to 50 rpm, the pressure control valve was set to 1.72 MPa (250 psi), and the autoclave was heated. The pressure was allowed to rise to 1.72 MPa at which point steam was vented to maintain the pressure at 1.72 Mpa. The temperature of the contents was allowed to rise to 240° C. The pressure was then reduced to 0 prig over about 45 minutes. During this time, the temperature of the contents rose to 260° C. The autoclave pressure was reduced to 5 psia by applying vacuum and held there for 20 minutes. The autoclave was then pressurized with 65 psia nitrogen and the molten polymer was extruded into strands, quenched with cold water and cut into pellets.

The co-polyamide obtained had an inherent viscosity (IV) of 1.30 dl/g. The polymer had a melting point of 195° C., as measured by differential scanning calorimetry (DSC).

PA MXD6 is nylon MXD6 Grade S6001, available from Mitsubishi Gas Chemical America Inc. 655 Third Avenue, 24$^{th}$ Floor, New York, N.Y. 10017.

Cu heat stabilizer refers to a mixture of 7 parts of potassium iodide and 1 part of copper iodide in 1.0 part of a stearate wax binder.

Naugard® 445 hindered amine refers to 4,4' di(.α,α-dimethylbenzyl)diphenylamine available commercially from Uniroyal Chemical Company, Middlebury, Conn.

Akrochem 383SWP refers to 4,4'-butylidenebis(6-t-butyl-m-cresol) hindered bisphenol available from Akrochem Corp., Akron, Ohio 44304.

Irgafos® 168 phosphite processing stabilizer refers to tris (2,4-ditert-butylphenyl)phosphate supplied by Ciba Specialty Chemicals.

C-Black refers to ZYTFE3800 black concentrate provided by E.I. du Pont de Nemours & Co., Inc. (Wilmington, Del., USA).

EVOH refers to EVAL® ethylene vinyl alcohol resin available from Kuraray, Tokyo, Japan.

EXAMPLE 1 AND COMPARATIVE EXAMPLES C1-C-4

The compositions listed in Table 1 where melt blended and molded into ISO test bars. Samples were subjected to air oven aging for periods up to 1000 hours.

Other samples were subjected to Zinc chloride immersion stress testing up to 168 hours. The physical test results are listed in Table 1.

The results show that Example 1 maintains 100% retention of tensile strength after 500 hours AOA at 150° C.; whereas the comparative examples C-1 and C-2 show 97 and 75% retention of tensile strength, respectively, under the same conditions. This indicates that Example 1 shows a significant and unexpected improvement in AOA performance as compared to those having conventional heat stabilizer combinations.

Comparative Example C-4 shows a significant improvement in zinc chloride immersion stability over that of Comparative Example C-3 comprising conventional MXD6 homopolymer.

TABLE 1

| Example | C-1 | C-2 | 1 | C-3 | C-4 |
|---|---|---|---|---|---|
| PA612/MXD12 70/30 | 96.5 | 96.1 | 93.5 | | 99.6 |
| PA MXD6 | | | | 99.6 | |

TABLE 1-continued

| Example | C-1 | C-2 | 1 | C-3 | C-4 |
|---|---|---|---|---|---|
| Naugard 445 | 0.5 | 0.5 | 0.5 | | |
| Akrochem 383SWP | 0.5 | 0.5 | 0.5 | | |
| Irgafos 168 | 0.5 | 0.5 | 0.5 | | |
| C-Black FE3800 | 2 | 2 | 2 | | |
| Cu heat stabilizer | | 0.4 | | 0.4 | 0.4 |
| EVOH | | | 3 | | |
| AOA 150° C. | | | | | |
| TS (MPa) 0 h | 58 | 55 | 59 | 117 | 57 |
| TS (MPa) 500 h | 56 | 41 | 59 | | |
| TS (MPa) 1000 h | 35 | 30 | 36 | | |
| 500 hrs TS Retention (%) | 97 | 75 | 100 | | |
| 1000 hrs TS Retention (%) | 60 | 55 | 61 | | |
| El (%) 0 h | 123 | 109 | 130 | | |
| El (%) 500 h | 4 | 2 | 1 | | |
| El (%) 1000 h | 2 | 2 | 2 | | |
| 500 hrs El Retention (%) | 3 | 2 | 1 | | |
| 1000 hrs El Retention (%) | 2 | 2 | 2 | | |
| $ZnCl_2$ immersion (h, observation) | | | | 4 h, cracks in 5/5 | 168 h, no failure |

TS = tensile strength,
EL = elongation to break

We claim:

1. A polyamide composition comprising
   (a) at least one semi-aromatic copolyamide, said semi-aromatic copolyamide consisting essentially of 25 to 55 mole percent repeat units of the formula —C(O)(CH$_2$)$_m$C(O)NHCH$_2$ArCH$_2$NH—  (I)

and 45 to 75 mole percent repeat units of the formula

—C(O)(CH$_2$)$_m$C(O)NH(CH$_2$)$_n$NH—  (II)

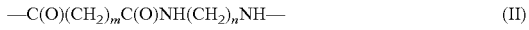

wherein m is 10, and/or 12, n is 6, 10 and/or 12 and Ar is a meta-substituted benzene ring; and said semi-aromatic copolyamide has a melting point equal to or less than 225°C.; and (b) 0.25 to 20 weight percent of one or more polyhydroxy polymer(s) having a number average molecular weight of at least 2000 and selected from the group consisting of ethylene/vinyl alcohol copolymer and poly(vinyl alcohol);
   wherein the stated weight percent is based upon the total weight of the said polyamide composition.

2. The polyamide composition of claim 1 wherein n equal to 6.

3. The polyamide composition of claim 1 wherein n equal to 10.

4. The polyamide composition of claim 1 wherein the one or more polyhydroxy polymer(s) is an ethylene/vinyl alcohol copolymer and has a vinyl alcohol content of 40 to 75 mol %, wherein the remainder mol % is ethylene.

5. The polyamide composition of claim 1 further comprising 2 to 20 weight percent polymeric toughener selected from the group consisting of: a copolymer of ethylene, glycidyl (meth)acrylate, and optionally one or more (meth)acrylate esters; an ethylene/α-olefin or ethylene/α-olefin/diene copolymer grafted with an unsaturated carboxylic anhydride; a copolymer of ethylene, 2-isocyanatoethyl (meth)acrylate, and optionally one or more (meth)acrylate esters; and a copolymer of ethylene and (meth)acrylic acid reacted with a Zn, Li, Mg or Mn compound to form the corresponding ionomer.

6. The polyamide composition of claim 1, further comprising one or more reinforcement agents selected from the group consisting calcium carbonate, glass fibers with circular and noncircular cross-section, glass flakes, glass beads, carbon fibers, talc, mica, wollastonite, calcined clay, kaolin, diatomite, magnesium sulfate, magnesium silicate, barium sulfate, titanium dioxide, sodium aluminum carbonate, barium ferrite, potassium titanate and mixtures thereof.

7. A molded or extruded article comprising the polyamide composition of claim 1.

\* \* \* \* \*